United States Patent
Dasari et al.

(10) Patent No.: US 10,303,883 B2
(45) Date of Patent: May 28, 2019

(54) FIRMWARE VERIFICATION THROUGH DATA PORTS

(71) Applicant: Hewlett Packard Enterprise Development LP, Houston, TX (US)

(72) Inventors: Shiva R. Dasari, Houston, TX (US); Nicholas Ramirez, Houston, TX (US); Fraser John Dickin, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 72 days.

(21) Appl. No.: 15/333,779

(22) Filed: Oct. 25, 2016

(65) Prior Publication Data

US 2018/0114024 A1   Apr. 26, 2018

(51) Int. Cl.
   *G06F 21/44* (2013.01)
   *G06F 21/57* (2013.01)
   *G06F 21/60* (2013.01)

(52) U.S. Cl.
   CPC ............ *G06F 21/572* (2013.01); *G06F 21/44* (2013.01); *G06F 21/575* (2013.01); *G06F 21/604* (2013.01)

(58) Field of Classification Search
   CPC .... G06F 21/572; G06F 21/604; G06F 21/575; G06F 21/44
   See application file for complete search history.

(56) References Cited

U.S. PATENT DOCUMENTS

| | | | |
|---|---|---|---|
| 8,250,223 B2 * | 8/2012 | Chen | H04M 1/72525 709/228 |
| 9,292,300 B2 * | 3/2016 | Huang | G06F 21/575 |
| 9,298,925 B1 | 3/2016 | Crittall et al. | |
| 2003/0212897 A1 * | 11/2003 | Dickerson | G06F 21/71 726/34 |
| 2004/0024868 A1 | 2/2004 | Drummond, II | |
| 2005/0165783 A1 * | 7/2005 | Hyser | G06F 9/468 |
| 2005/0197099 A1 * | 9/2005 | Nehushtan | H04L 63/083 455/410 |
| 2007/0261046 A1 * | 11/2007 | Miller | G06F 8/65 717/168 |
| 2009/0271533 A1 * | 10/2009 | Asnaashari | G06F 3/0605 710/13 |
| 2010/0023777 A1 * | 1/2010 | Prevost | G06F 21/572 713/180 |

(Continued)

FOREIGN PATENT DOCUMENTS

WO     2014057199     3/2016

OTHER PUBLICATIONS

Defense Science Board, "Resilient Military Systems and the Advanced Cyber Threat", Jan. 2013, 146 pages.

*Primary Examiner* — Michael Pyzocha
(74) *Attorney, Agent, or Firm* — Hewlett Packard Enterprise Patent Department

(57) ABSTRACT

In some examples, a computing device includes a data port, device memory to store firmware for the computing device, and verification circuitry. The verification circuitry may override operation of the data port responsive to a determination that firmware verification mode criteria are satisfied. The verification circuitry may also extract firmware data from the device memory for verification of the firmware and provide the firmware data to an external device connected to the computing device through the data port.

21 Claims, 6 Drawing Sheets

(56) References Cited

U.S. PATENT DOCUMENTS

| | | | |
|---|---|---|---|
| 2010/0262863 A1* | 10/2010 | Hess | G06F 11/0748 |
| | | | 714/32 |
| 2011/0131403 A1* | 6/2011 | Ibrahim | G06F 21/572 |
| | | | 713/2 |
| 2011/0185131 A1* | 7/2011 | Hayashi | H04N 5/772 |
| | | | 711/154 |
| 2013/0339713 A1* | 12/2013 | Huang | G06F 21/572 |
| | | | 713/2 |
| 2014/0259095 A1 | 9/2014 | Bryant | |
| 2015/0050678 A1* | 2/2015 | Elder | C12Q 1/54 |
| | | | 435/14 |
| 2015/0100299 A1* | 4/2015 | Abraham | G06F 8/447 |
| | | | 703/22 |
| 2015/0261521 A1* | 9/2015 | Choi | H04L 9/3247 |
| | | | 713/176 |
| 2015/0365237 A1* | 12/2015 | Soffer | H04L 9/3234 |
| | | | 726/20 |
| 2016/0283419 A1* | 9/2016 | Yasumoto | G06F 13/20 |
| 2016/0306616 A1* | 10/2016 | Tomppo | G06F 8/65 |
| 2017/0024164 A1* | 1/2017 | Yang | G06F 3/0652 |
| 2017/0131991 A1* | 5/2017 | Su | G06F 8/665 |
| 2017/0215074 A1* | 7/2017 | Choi | H04W 12/10 |
| 2017/0302640 A1* | 10/2017 | Maletsky | H04L 9/3247 |
| 2018/0060589 A1* | 3/2018 | Polak | G06F 21/572 |
| 2018/0095770 A1* | 4/2018 | Brown | G06F 9/4411 |

* cited by examiner

FIRMWARE VERIFICATION THROUGH DATA PORTS

BACKGROUND

With rapid advances in technology, computing systems are used in virtually all aspects of society today. Computing systems and devices are increasing in complexity and processing capability, and may be used in various industries and contexts. Increases in the efficiency, capability, and security of computing systems will result in further widespread use and adoption of technology.

BRIEF DESCRIPTION OF THE DRAWINGS

Certain examples are described in the following detailed description and in reference to the drawings.

DETAILED DESCRIPTION

Examples consistent with the present disclosure may support verification of firmware of a computing device through a data port of the computing device. As described in greater detail below, firmware verifications may be accomplished by overriding use of a data port to grant access a device memory storing device firmware. The granted access may be on a read-only basis, limiting access to extracting the firmware image or other firmware data (e.g., a computed hash) to verify the integrity of the firmware. Also, access to the device memory may be granted in limited circumstances, e.g., according to any of the firmware verification mode criteria described herein that include various events, triggers, time periods, and other control parameters. Outside of firmware verification processes, the data port may operate in a normal manner, e.g., for linking to connected devices to an operating system or central processing unit (CPU) of the computing device for data transfers and the like.

By supporting firmware verifications through data ports of a computing device, the firmware verification features described herein may increase the ease or flexibility in performing firmware verification while limiting security vulnerabilities in the verification process. As another benefit, an on-site user or customer may access data ports from a front panel of a computing device without having to open a physical enclosure of the computing device. Such ease of access may increase the frequency at which firmware verifications are performed, which may result in more detections of malicious intrusions and corruptions of device firmware. Moreover, the firmware verification features described herein may be applicable to identify malicious attacks that occur when a device is traversing a supply chain, e.g., during manufacturing, transit, storage, or deployment. By supporting on-demand firmware verifications in a flexible and user-friendly manner, the features described herein may allow end-users to themselves verify server or device integrity, and without solely relying on manufacturer assertions of integrity.

Figure 1:
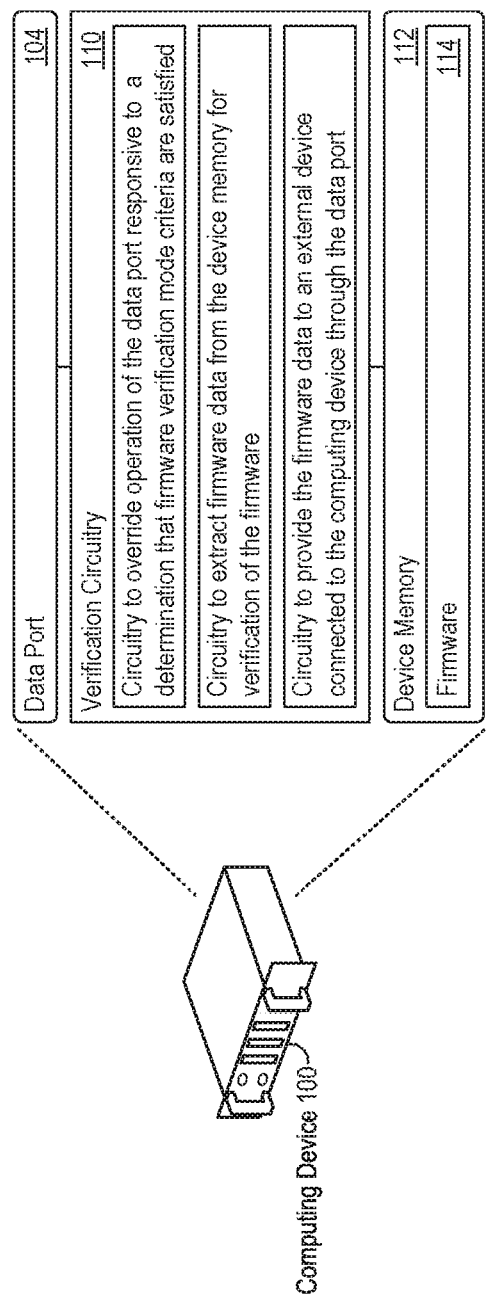
FIG. 1 shows an example of a computing device that supports firmware verification through data ports of the computing device.

FIG. 1 shows an example of a computing device 100 that supports firmware verification through data ports of the computing device 100. The computing device 100 may be any electronic device that processes data, such as any type of server, desktop or laptop computers, compute nodes, mobile communication devices, tablet devices, networking and routing devices, and many more.

In the example shown in FIG. 1, the computing device 100 includes a data port 104. A data port may refer to any physical interface through which data is communicated to or from an electronic device (e.g., the computing device 100). As examples, the data port 104 may be a universal serial bus (USB) port, a digital visual interface (DVI) port, any type of display port, any type of serial or parallel data port, a video graphics array (VGA) port, any type of plug-and-play port, a FireWire port, a high-definition multimedia interface (HDMI) port, or any other port or interface that supports data communications across any other protocol or standard.

The computing device 100 shown in FIG. 1 also includes a device memory 112. The device memory 112 may store firmware for the computing device 100, which may take the form of instructions embedded onto the device memory 112. In some examples, the device memory 112 is a read-only memory (ROM), an electrically erasable programmable ROM (EEPROM), flash memory, or another type of non-volatile memory upon which device firmware is embedded upon. Device memory with embedded firmware may be a dedicated or special-purpose memory to store firmware, and may be distinct physically or logically from other memory elements of the computing device 100, such as random access memories (RAMs), hard drives, solid state drives, and others.

In the example of FIG. 1, the device memory 112 stores the firmware 114. The firmware 114 may control various operations of the computing device 100, including fundamental or high-priority operations of the computing device 100. As such, the firmware 114 may be the subject of attacks such as malware injection to spoof device identity, mine proprietary data, spy on device users or enterprises, or otherwise compromise security of the computing device 100. The device memory 112 may specifically store the firmware 114 and access to the device memory 112 may be regulated to prevent authorized access and tampering of the firmware 114.

The computing device 100 may include verification circuitry 110. The verification circuitry 110 may be any circuitry that implements any of the features described herein, and may thus have different forms and implemented features. As described in greater detail herein, the verification circuitry 110 may control operation of the data port 104 to provide limited access to the device memory 112 for firmware verifications. For instance, the verification circuitry 110 may override or suspend normal operation of the data port 104 responsive to determining firmware verification mode criteria are satisfied (e.g., detecting certain firmware verification conditions have occurred). In overriding operation of the data port 104, the verification circuitry 110 may route the data port 104 to access the device memory 112 to extract firmware data for a firmware verification, e.g., through pulling image data of the firmware 114, computing a hash value for the firmware 114, and the like.

The verification circuitry 110 may provide the extracted firmware data to an external device for verification. After the integrity or authenticity of the firmware is verified, the verification circuitry 110 may resume normal operation of the data port 104, e.g., by re-routing the data port 104 along a data path to a device CPU or other interface logic and prohibiting access to the device memory 112. In this manner, the verification circuitry 110 may support firmware verification of the firmware 114 through the data port 104 (or other data ports of the computing device 100).

The computing device 100 may implement the verification circuitry 110 in various forms, such as dedicated hardware, as programmable logic such as a complex programmable logic device (CPLD), as electronic circuitry, and the like. As such, the verification circuitry 110 may include various components to support, implement, or provide of any the firmware verification features described herein. As one specific example, the verification circuitry 110 shown in FIG. 1 includes circuitry to override operation of a data port 104 responsive to a determination that firmware verification mode criteria are satisfied, extract firmware data from a device memory 112 for verification of firmware 114, and provide the firmware data to an external device connected to a computing device 100 through the data port 104.

These and other aspects of the firmware verification features disclosed herein are described in greater detail next.

Figure 2:
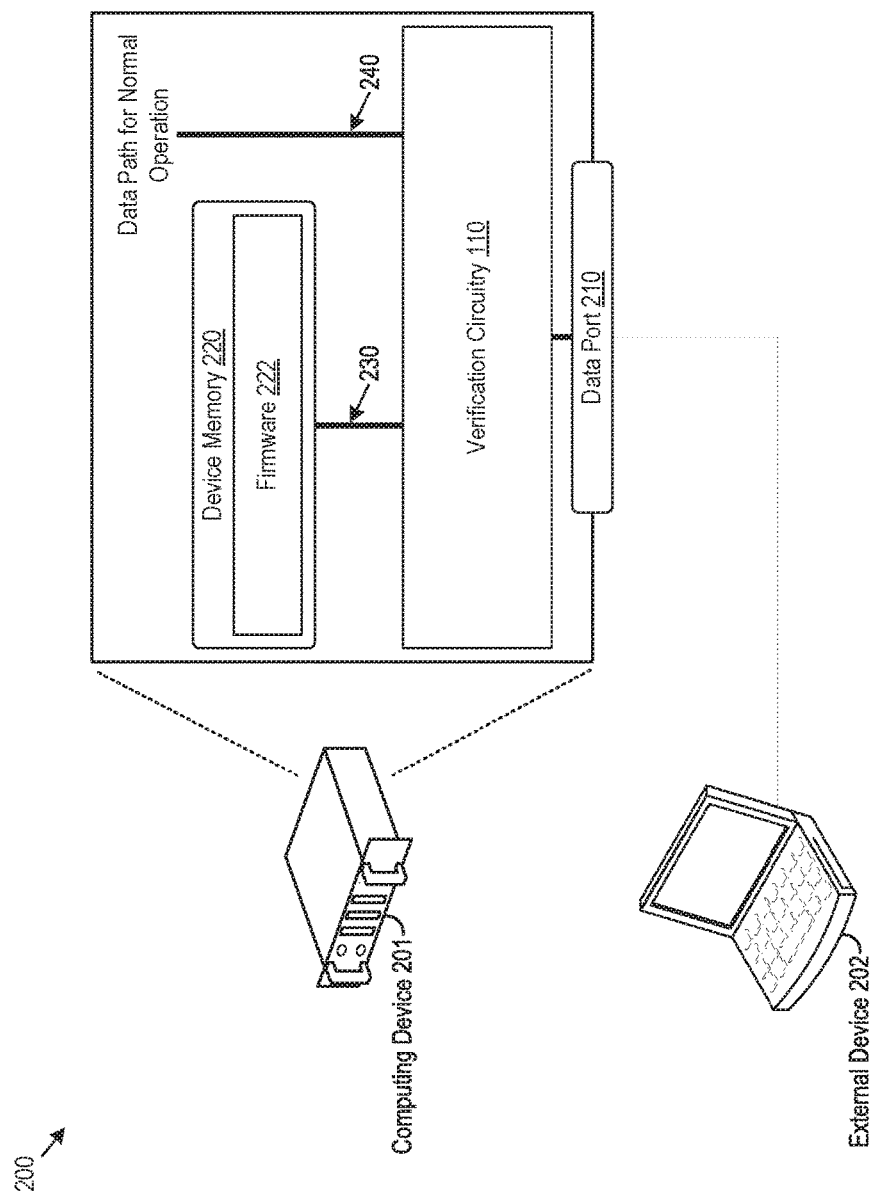
FIG. 2 shows an example of a system that supports verification of firmware of a computing device through data ports of the computing device.

FIG. 2 shows an example of a system 200 that supports verification of firmware of a computing device through data ports of the computing device. The system 200 shown in FIG. 2 includes a computing device 201 and an external device 202. The computing device 201 may include a data port 210, device memory 220 storing firmware 222, and verification circuitry 110. The external device 202 may link to the computing device 201 through the data port 210, and do so to verify the firmware 222 embedded on the device memory 220. The data port 210 may be accessible via an external face of a physical enclosure for the computing device 201, e.g., as a USB port, HDMI port, a DVI port, or other data ports accessible through a front, side, or back panel of the computing device 201.

In operation, the verification circuitry 110 may control the data path through which the data port 210 routes data within the computing device 201 (which may also be referred to as a port data path). In controlled scenarios, the verification circuitry 110 may permit the external device 202 to access the device memory 220 and extract firmware data for the firmware 222. In that regard, the verification circuitry 110 may route the port data path of the data port 210 along a data route 230 to the device memory 220 instead of along another data route 240 used for normal operation, e.g., to a hub controller, to a CPU, or to another data path corresponding to general-purpose use of the data port 210. Explained in another way, the verification circuitry 110 may implement or provide an additional data path for the data port 210, specifically a data path to access the device memory 220 for firmware verifications of the firmware 222. Through the additional data path, the verification circuitry 110 may selectively grant access to the device memory 220 by rerouting the port data path of the data port 210.

To illustrate in yet another way, the verification circuitry 110 may control an operation mode of the data port 210, which may include a normal operation mode and a firmware verification mode. The verification circuitry 110 may set the operational mode of the data port 210 to the normal operation mode by routing the data port 210 along a data path to a central processing unit (CPU) of the computing device 201. The verification circuitry 110 may set the operation mode of the data port 210 to a firmware verification mode by routing the data port 210 to access the device memory 220 that stores the firmware 222 for the computing device 201.

In some examples, the verification circuitry 110 controls direction of the port data path (and operation mode) according to firmware verification mode criteria. Responsive to a determination that firmware verification mode criteria are satisfied, the verification circuitry 110 may set the data port 210 to operate in a firmware verification mode, granting access to device memories storing firmware. The firmware verification mode criteria may include any set of conditions, events, triggers, parameters, sequence requirements, timing limits, or any other criteria by which the verification circuitry 110 may determine when to grant access to the device memory 220. Any of the firmware verification mode criteria may be configurable, for example by a system administrator, a manufacturer, or various other entities. Example aspects of firmware verification mode criteria that the verification circuitry 110 may apply are described next.

In some examples, the verification circuitry 110 may apply firmware verification mode criteria that minimizes or reduces the impact of firmware verifications upon normal operation of the computing device 201. For instance, firmware verification mode criteria may be satisfied (at least in part) outside of normal use of the computing device 201. Example conditions, triggers, or events of such firmware verification mode criteria may include when the computing device 201 draws standby power, when device inactivity exceeds a threshold amount of time, when a shut down or suspend instruction is received from a user, at specific non-active time intervals (e.g., non-business hours), and in various other scenarios.

The firmware verification mode criteria may additionally or alternatively account for the presence of an external device to conduct or otherwise support verification of device firmware. For instance, satisfaction of firmware verification mode criteria may require detection that an external device is linked through the data port 210, e.g., through a detected cable insertion into the data port 210 linking the external device 202, through a detected handshake protocol exchanged between the data port 210 and the external device 202, or in other ways. In that regard, the verification circuitry 110 may provide access to the device memory 220 and stored firmware 222 specifically when an external device is linked to perform the firmware verification, but prevent access otherwise. In some examples, firmware verification mode criteria may require authentication of the external device 202 as well, e.g., to confirm a trust level, identity, or any other security metric with regards to the external device 202.

As another aspect, firmware verification mode criteria applied by the verification circuitry 110 may support on-demand access to the device memory 220. On-demand accesses may be requested by a system administrator or a user entity with access rights exceeding a threshold level. In such examples, the firmware verification mode criteria may be satisfied (at least in part) based upon a user request for a firmware verification, including during active operation of the computing device 201 (e.g., when the computing device 201 draws system power or operates in an active operation mode as opposed to a standby or suspended mode).

While some example firmware verification mode criteria are described herein, any number of additional or alternative criteria may be applied by the verification circuitry 110. The verification circuitry 110 may also apply any combination of various criteria. For instance, the verification circuitry 110 may determine the firmware verification mode criteria are satisfied when both the computing device 201 draws standby power and the external device 202 is connected to the data port 210. As another example, the verification circuitry 110 may determine the firmware verification mode criteria are satisfied responsive to both receiving a user input requesting firmware verification and detecting that the external device 202 is connected to the data port 210.

Upon determining satisfaction of firmware verification mode criteria, the verification circuitry 110 may grant access to the device memory 220 and firmware 222 for a firmware verification. The external device 202, for example, may execute a firmware verification application to verify the firmware 222. In that regard, the external device 202 may issue read or other access firmware instructions through the data port 210, in response to which the verification circuitry 110 may obtain firmware image data or a computed hash. In some examples, the verification circuitry 110 provides read-only access to the memory device 220, limiting the extent to which the external device 202 or any other entity can access the firmware 222. The external device 202 may verify the integrity of the firmware data provided by the verification circuitry 110 through the data port 210, e.g., by comparing a computed hash value from the firmware 222 against a "golden" hash value released or otherwise made available by a manufacturer or firmware provider.

Upon completion of the firmware verification, the verification circuitry 110 may revoke or cease access to the firmware 222. In some examples, the verification circuitry 110 may set the operation mode of the data port 210 to a normal operation mode, rerouting the data path of the data port 210 back to a CPU instead of to the device memory 220. The verification circuitry 110 may do so, for example, upon detection of a device removal from the data port 210 (e.g., when a USB cable linking the external device 202 to the computing device 201 is removed from the data port 210). Also upon completion of the firmware verification, the external device 202, the computing device 201, or both, may display the result of the firmware verification (e.g., via a display, panel lights or indicators, audibly through a sound, etc.).

Figure 3:
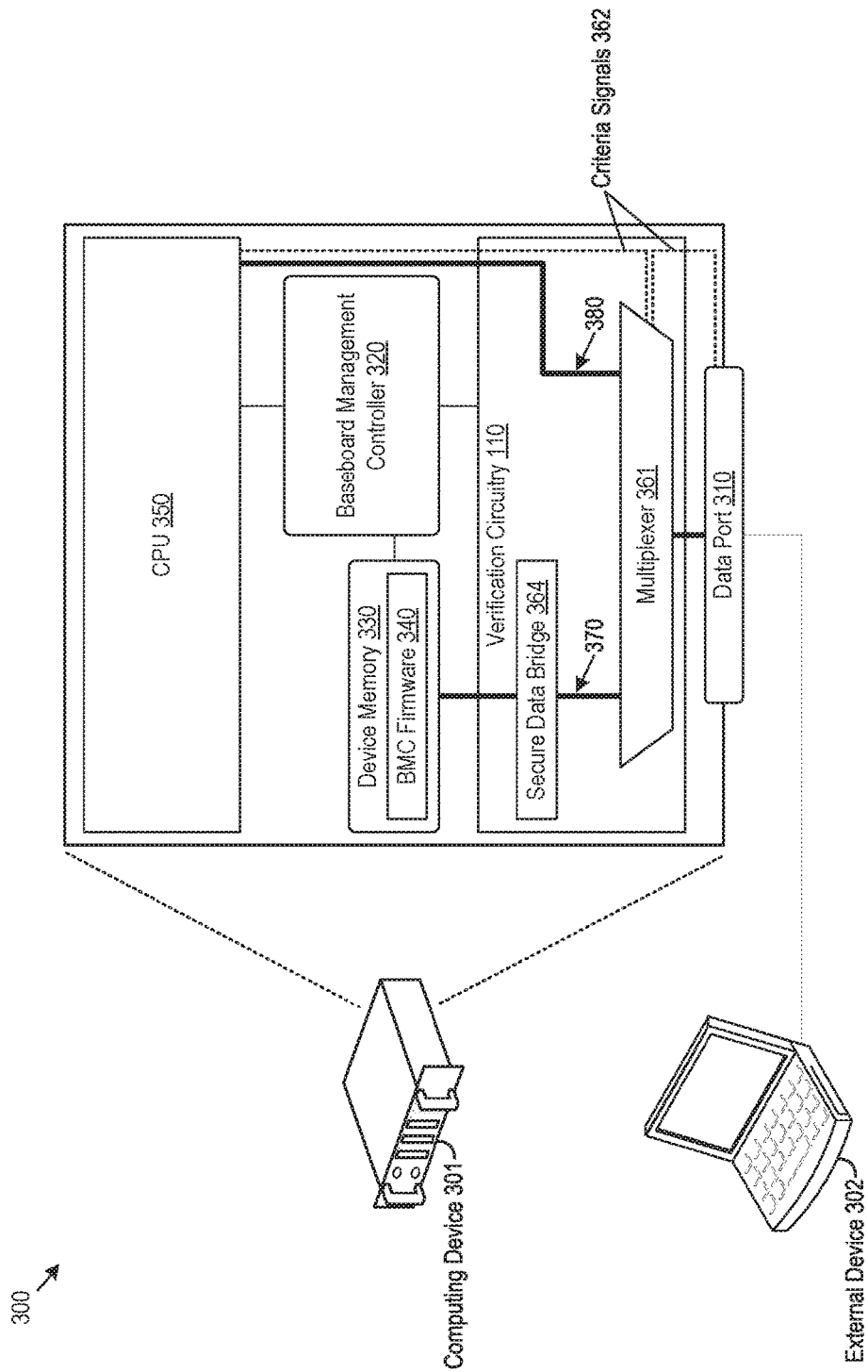
FIG. 3 shows an example of a system that supports verification of are of a computing device through data ports of the computing device.

FIG. 3 shows an example of a system 300 that supports verification of firmware of a computing device through data ports of the computing device. The specific type of firmware illustrated in FIG. 3 is firmware of a baseboard management controller (BMC). A baseboard management controller may be a server or device management system implemented in the computing device 201 that includes an out-of-band processor to execute the BMC firmware. A baseboard management controller may also be known as a service processor or a management processor. However, the firmware verification features described herein may be consistently applied to any type of firmware that is embedded, implemented, or used by a computing device.

The system 300 shown in FIG. 3 includes a computing device 301 and an external device 302. The computing device 301 in FIG. 3 includes a data port 310, a baseboard management controller 320, device memory 330 storing BMC firmware 340, and a CPU 350.

The verification circuitry 110 may control operation of the data port 310, routing a port data path of the data port 310 through either a data route to the device memory 330 for firmware access or along a data route used during normal device operation. In the example in FIG. 3, the data route used during normal device operation by the data port 310 includes a route to the CPU 350 (which, in some examples, may route through I/O management components or other data path elements of the computing device 301 and further on to the CPU 350). To support route selection of the port data path between the device memory 330 and the CPU 350, the verification circuitry 110 may include a multiplexer 361, which may toggle access by the data port 310 to either the device memory 330 storing the BMC firmware 340 or the CPU 350.

The particular route selected by the multiplexer 361 may be controlled by any number of criteria signals 362. The criteria signals 362 may include any signal that communicates data about a particular system state or element, and may be selected specific to the particular firmware verification mode criteria applied by the verification circuitry 110. In that regard, the verification circuitry 110 may specify or control which particular firmware verification mode criteria are applied through the particular criteria signals 362 used to drive a select input of the multiplexer 361. The criteria signals 362 may include a signal from the data port 310 indicating when a device insertion or removal is detected, a CPU or operating system signal indicating when the computing device 301 is in a standby state, a power supply signal indicating when the computing device 301 is drawing standby power, a clock signal to indicate passage of time or identify specific time periods, or any other system signal.

In some examples, the verification circuitry 110 includes conversion circuitry to interpret and translate the criteria signals 362 into a selection value representative of an operation mode for the data port 310. In that regard, the conversion circuitry may implement the firmware verification mode criteria, outputting a binary selection value to control the multiplexer 361. In such examples, a '0' value generated by the conversion circuitry may represent the firmware mode verification criteria is not (or no longer) satisfied, causing the multiplexer 361 to route the data port 310 along a "normal operation" data path to the CPU 350. A '1' value generated by the conversion circuitry may represent satisfaction of the firmware verification mode criteria, causing the multiplexer 361 to route the data port 310 to grant the external device 302 access to the BMC firmware 340 instead of along the "normal operation" data path. In that regard, the verification circuitry 110 may override "normal" operation of the data port 310 for a firmware verification when the firmware verification mode criteria are satisfied.

In some examples, the verification circuitry 110 may include bridge circuitry to bridge data communications according to different protocols or standards. To provide an illustrative example, the data port 310 may be a USB port supporting data communications according to a serial communication protocol. A data bus lining the device memory 330 may communicate according to a serial peripheral interface (SPI) protocol. Thus, in order to grant access to the device memory 330 through the data port 310, bridge circuitry may translate communications between protocols to support data accesses. In the example shown in FIG. 3, the verification circuitry 110 includes a secure data bridge 364, which may provide communications support for, e.g., SPI-to-USB communications (and vice versa).

The secure data bridge 364 may limit the access to the device memory 330. For instance, the secure data bridge 364 may permit read-only transactions directed to the device memory 330 by the external device 302, but discard, ignore, or otherwise prohibit write transactions to the device memory 330. In doing so, the verification circuitry 110 may protect the integrity of the BMC firmware 340, even during the firmware verification process itself.

As such, the secure data bridge 364 may provide read-only access to the device memory 330. In overriding the data port 310, the verification circuitry 110 may route the data port 310 to the secure data bridge 364 to access the device memory 330 instead of routing the data port 310 along a data path to the CPU 350 of the computing device 301. In such examples, the verification circuitry 110 may cease the override responsive to a determination that the firmware verification mode criteria are no longer satisfied, including rerouting the data port 310 along the data path to the CPU 350 of the computing device 301.

Thus, the verification circuitry 110 may control the data port 310 to operate along a data route 370 providing access to the device memory 330 and BMC firmware 340 or along another data route 380 used for normal operation traversing (directly or indirectly) to a CPU 350 of the computing device 301. In that regard, the verification circuitry 110 may override operation of the data port 310 to specifically provide access to device firmware during controlled scenarios, which may provide flexibility to verify the firmware as well as security and control as to when such firmware accesses are granted.

In some examples, the verification circuitry 110 may limit access to device firmware by other device or system entities during the firmware verification. To illustrate in the context of FIG. 3, the verification circuitry 110 may prevent access to the BMC firmware 340 by the baseboard management controller 320 responsive to determining firmware verification mode criteria satisfied. Doing so may avoid or reduce 2-way access collisions for the BMC firmware 340.

As another illustrative example, the verification circuitry 110 may prevent access to device firmware by holding a boot sequence of the computing device 301. In holding an initial boot sequence of the computing device (e.g., the first boot sequence of the device after deployment), the verification circuitry 110 may prevent execution of device firmware prior to verification. Doing so may support detection of malicious code injections or other attacks that occur in the supply chain, and prevent inadvertent or unintended execution of compromised firmware. The verification circuitry 110 may prevent a boot sequence that includes execution of device firmware responsive to a determination that firmware verification mode criteria are satisfied. For instance, the verification circuitry 110 may prevent, pause, or suspend the boot sequence of the baseboard management controller 320, preventing execution of the BMC firmware 340 until after a firmware verification completes. After the verification of the firmware completes, the verification circuitry 110 may resume the boot sequence (e.g., of the baseboard management controller 320) and return an overridden data port to normal operation.

Although the verification circuitry 110 is shown as controlling a single data port in FIG. 3, the verification circuitry 110 may control any number of data ports of a computing device to support firmware verification. For a set of USB ports accessible through a front panel of a computing device, for example, the verification circuitry 110 may implement a multiplexer or other control circuitry for each of the USB ports, thus supporting firmware verification of device firmware through any of the USB ports (or any other externally accessible port of the computing device). As described above, the verification circuitry 110 may support firmware verifications through data ports of a computing device.

Figure 4:
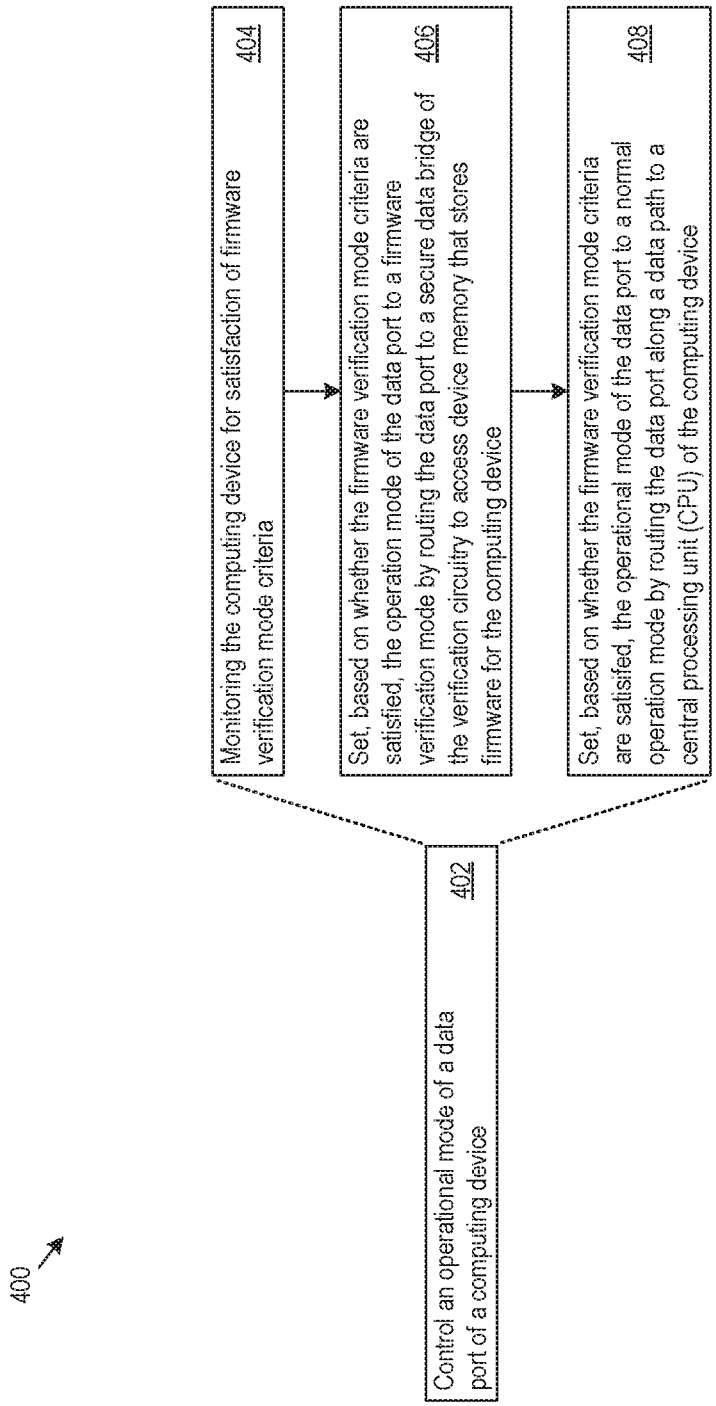
FIG. 4 shows a flow chart of an example method for firmware verification through data ports.

FIG. 4 shows a flow chart of an example method 400 for firmware verification through data ports. Execution of the method 400 is described with reference to the verification circuitry 110 of a computing device, though any other device circuitry, hardware, programmable logic, hardware-programming combination, or other suitable element of a computing device may execute any of the elements of the method 400.

In implementing or performing the method 400, the verification circuitry 110 may control an operational mode of a data port of the computing device (402). Such control may include the verification circuitry 110 monitoring the computing device for satisfaction of firmware verification mode criteria (404), including tracking whether any of the firmware verification mode criteria described herein are satisfied. Based on whether the firmware verification mode criteria are satisfied, the verification circuitry 110 may set the operation mode of the data port to a firmware verification mode by routing the data port to a secure data bridge of the verification circuitry 110 to access device memory that stores firmware for the computing device (406). The verification circuitry 110 may provide read-only access to the device memory through the secure data bridge when the data port operates in the firmware verification mode. Control of the operation mode by the verification circuitry 110 may also include setting, based on whether the firmware verification mode criteria are satisfied, the operational mode of the data port to a normal operation mode by routing the data port along a data path to a CPU of the computing device (408). The verification circuitry 110 may set the operational mode of the data port to the normal operation mode further by preventing access to the device memory by the data port.

The verification circuitry 110 may set the operation mode of the data port to the firmware verification mode responsive to determining firmware verification mode criteria are satisfied. Also, the verification circuitry 110 may set the operation mode of the data port to the normal operation mode responsive to determining that the firmware verification mode criteria are not satisfied. As an example of criteria, the verification circuitry 110 determines the firmware verification mode criteria are satisfied when both the computing device draws standby power and an external device is connected to the data port. As another example, the verification circuitry 110 determines the firmware verification mode criteria are satisfied responsive to both receiving a user input requesting firmware verification and detecting that an external device is connected to the data port.

Although one example is shown in FIG. 4, the method 400 may be ordered in various ways. Likewise, the method 400 may include any number of additional or alternative elements as well, including elements implementing any of the firmware verification features described herein (e.g., with respect to the verification circuitry 110)

Figure 5:
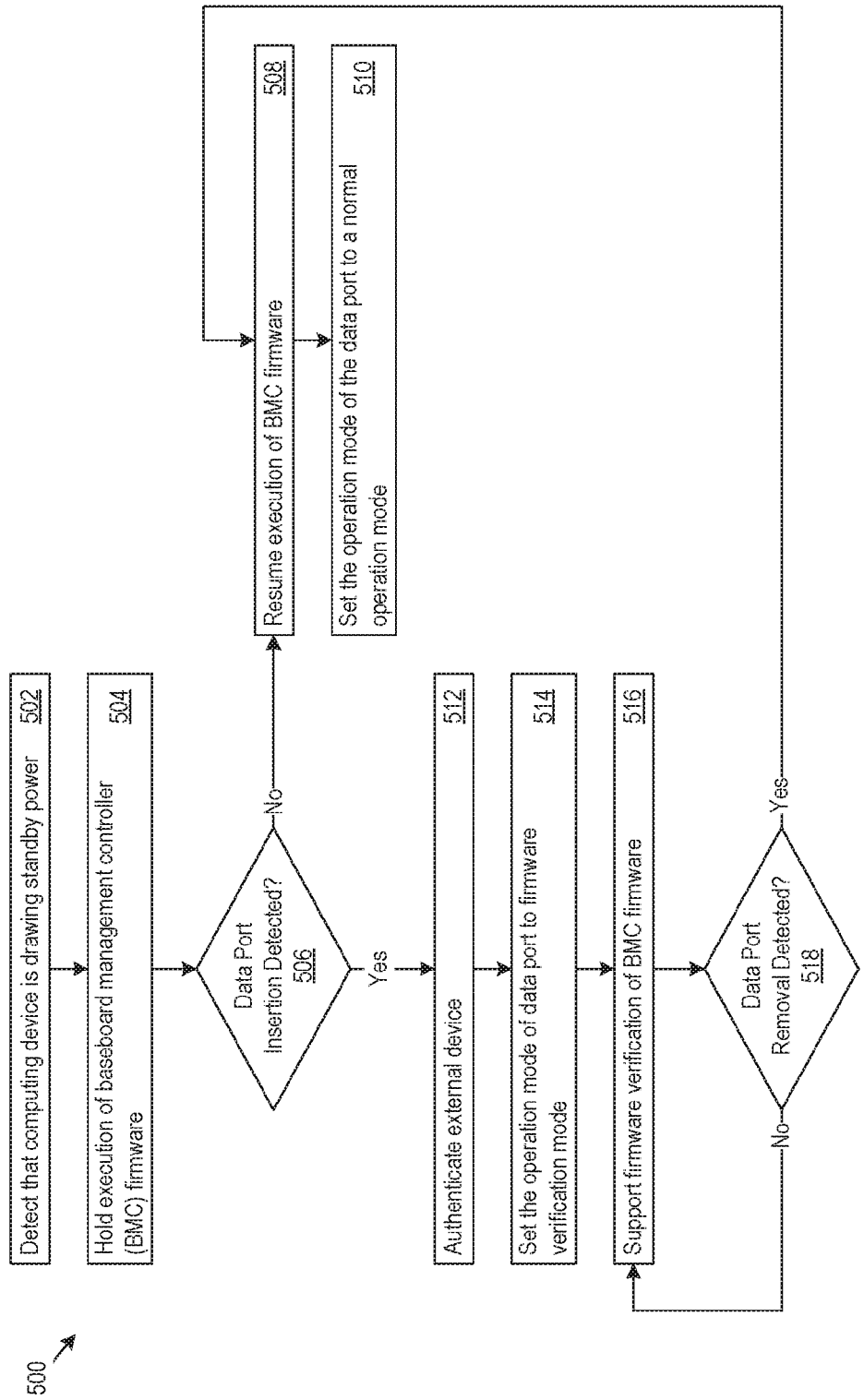
FIG. 5 shows a flow chart of another example method for firmware verification through data ports.

FIG. 5 shows a flow chart of another example method 500 for firmware verification through data ports. Execution of the method 500 is described with reference to the verification circuitry 110 of a computing device, though any other device circuitry, hardware, programmable logic, hardware-programming combination, or other suitable element of a computing device may execute any of the elements of the method 500.

In implementing or executing the method 500, the verification circuitry 110 may detect that a computing device implementing the verification circuitry 110 is drawing standby power (502). The verification circuitry 110 may do so, for example, by receiving a criteria signal from a CPU, power supply, or other device component indicating the computing device is drawing standby power. The verification circuitry 110 may also hold execution of BMC firmware (504), for example during a boot sequence of the computing device. To do so, the verification circuitry 110 may issue a hold instruction or otherwise instruct a baseboard management controller to cease, suspend, or prohibit execution of the BMC firmware.

While the computing device draws standby power, the verification circuitry 110 may determine whether an insertion into a data port controlled by the verification circuitry 110 occurs (506). A detected insertion may include a USB cable inserted into a USB port linking to an external device, insertion of an external USB device (e.g., thumb drive) with wireless capabilities to perform a firmware verification, and the like. In some examples, the verification circuitry 110 detects physical insertions into a data port as well as logical insertions by external devices linking to a data port without physical insertion, e.g., an external device wirelessly linking to a Bluetooth or other wireless port.

In some examples, the verification circuitry 110 may monitor data ports of the computing device for insertions (or other linking mechanisms) by an external device during a specific time period. The verification circuitry 110 may identify the start of monitored time period upon detection that the computing device draws standby power or upon initiation of a device boot sequence, as examples. Examples of preconfigured time periods (or windows) may include a 10 second window after initiating a boot sequence of a server, a 30 second window after a computing device enters a suspend state, or a 12 hour window during non-business hours of an enterprise. Any number of configurable time periods may be used by the verification circuitry 110 to monitor for insertions into a data port.

Employing a preconfigured time period may allow for system administrator or other user to perform a firmware verification prior to execution of the BMC firmware, e.g., through linking the external device via a data port of the computing device. The time period may also allow for a controlled time window in which the verification circuitry 110 performs firmware verifications, instead of indefinitely holding execution of the BMC firmware. As such, detection of a data port insertion during a configured time period when the computing device draws standby power may provide one example of firmware verification mode criteria applied by the verification circuitry 110.

When the verification circuitry 110 determines that no data port insertion has been detected (e.g., during a preconfigured time window), the verification circuitry 110 may resume execution of the BMC firmware (508) and set the operation mode of a data port to a normal operation mode (510). When the verification circuitry 110 detects a data port insertion (e.g., during the preconfigured time window), the verification circuitry 110 may authenticate an external device directly or indirectly linked through the data port (512). In some examples, authentication of the external device fails, in which the verification circuitry 110 may nonetheless proceed with the firmware verification using nonces or other authentication tokens to verify firmware.

Upon authentication, the verification circuitry 110 may set the operation mode of the data port to a firmware verification mode (514), e.g., in any of the ways described herein to override operation or route the port data path to a device memory upon which BMC firmware is embedded. Then, the verification circuitry 110 may support a firmware verification of the BMC firmware (516), such as by extracting firmware data from the device memory to provide to the external device for verification. The verification circuitry 110 may continue to support the firmware verification until detection of a data port removal (518). The data port removal may sever the link to the external device and may thus signify completion (or interruption) of the firmware verification. In such cases, the verification circuitry 110 may resume execution of the BMC firmware (508) and set the operation mode of the of the data port to a normal operation mode (510), thus ceasing an override of the data port to support verification of the BMC firmware.

Although one example is shown in FIG. 5, the method 500 may be ordered in various ways. Likewise, the method 500 may include any number of additional or alternative elements as well, including elements implementing any of the firmware verification features described herein (e.g., with respect to the verification circuitry 110). While the method 500 is described with respect to BMC firmware, the method 500 may be similarly or consistently performed for any other type of firmware stored, executed, or used by a computing device.

Figure 6:
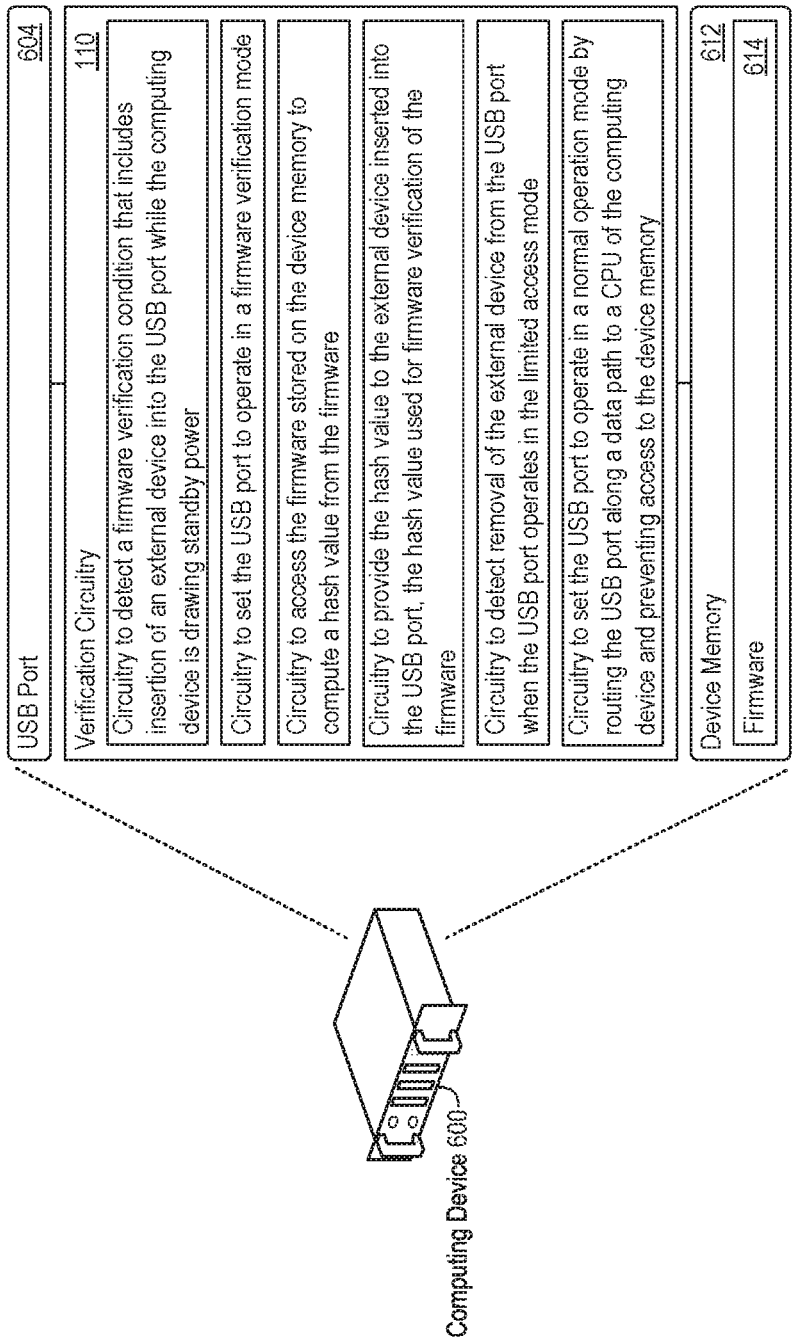
FIG. 6 shows an example of a computing device that supports firmware verification through data ports of the computing device.

FIG. 6 shows an example of a computing device 600 that supports firmware verification through data ports of the computing device 600. The computing device 600 shown in FIG. 6 includes a data port in the form of a USB port 604, device memory 612 storing firmware 614 of the computing device 600, and verification circuitry 110 linking the USB port 604 and the device memory 612.

The verification circuitry 110 may detect firmware verification conditions, which may include any events, circumstances, triggers, or other sequences that satisfy firmware verification mode criteria. In the specific implementation shown in FIG. 6, the verification circuitry 110 includes circuitry to detect a firmware verification condition that includes insertion of an external device into the USB port 604 while the computing device 600 is drawing standby power. The verification circuitry 110 may respond to the detection of the firmware verification condition, and include circuitry to set the USB port 604 to operate in a firmware verification mode; access the firmware 614 stored on the device memory 612 to compute a hash value from the firmware 614; and provide the hash value to the external device inserted into the USB port 604, the hash value used for firmware verification of the firmware 614. The verification circuitry 110 may also include circuitry to detect removal of the external device from the USB port 604 when the USB port 604 operates in the firmware verification mode, and in response, set the USB port 604 to operate in a normal operation mode by routing the USB port 604 along a data path to a CPU of the computing device 600 and preventing access to the device memory 612.

The verification circuitry 110 may include a secure data bridge that provides real-only access to the device memory 612, and the verification circuitry 110 may access the firmware 614 through the secure data bridge. In response to detection of the firmware verification condition, the verification circuitry 110 may prevent a boot sequence that includes execution of the firmware 614. In such examples, the verification circuitry 110 may resume the boot sequence in response to detection of the removal of the external device from the USB port when the USB port operates in the firmware verification mode. In some examples, the verification circuitry 110 may further authenticate the external device prior to provision of the hash value to the external device.

The systems, methods, devices, circuitry, and logic described above, including the verification circuitry, may be implemented in many different ways in many different combinations of hardware, logic (e.g., as a CPLD, a field-programmable gate array (FGPA), and the like), circuitry; and executable instructions stored on a machine-readable medium. For example, any of the elements described herein may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. The processing capability of the systems, devices, and circuitry described herein may be distributed among multiple system components, such as among multiple processors and memories, which may include multiple distributed processing systems.

While various examples have been described herein, more implementations are possible.

The invention claimed is:

1. A computing device comprising:
a data port;
device memory to store firmware for the computing device; and
verification circuitry to:
override operation of the data port responsive to a determination that firmware verification mode criteria are satisfied, wherein the verification circuitry is further to determine that the firmware verification mode criteria are satisfied in response to an external device being connected to the data port and a signal representing that the computing device is drawing standby power associated with a standby mode of operation;
extract firmware data from the device memory for verification of the firmware; and
provide the firmware data to the external device connected to the computing device through the data port.

2. The computing device of claim 1, wherein the verification circuitry is to determine the firmware verification mode criteria are satisfied responsive to both receiving a user input requesting firmware verification and detecting that the external device is connected to the data port.

3. The computing device of claim 1, wherein the verification circuitry comprises a secure data bridge to provide read-only access to the device memory; and
wherein to override the data port, the verification circuitry routes the data port to the secure data bridge to access the device memory instead of routing the data port along a data path to a central processing unit (CPU) of the computing device.

4. The computing device of claim 3, wherein the verification circuitry is to cease the override responsive to a determination that the firmware verification mode criteria are no longer satisfied, wherein to cease the override includes rerouting the data port along the data path to the CPU of the computing device.

5. The computing device of claim 1, wherein the verification circuitry is further to prevent a boot sequence that includes execution of the firmware responsive to a determination that firmware verification mode criteria are satisfied.

6. The computing device of claim 5, wherein the verification circuitry is further to resume the boot sequence and return the data port to normal operation after the verification of the firmware completes.

7. The computing device of claim 5, further comprising a Baseboard Management Controller, wherein the verification circuitry prevents the Baseboard Management Controller from executing the firmware responsive to the verification circuitry determining that the firmware verification mode criteria are satisfied.

8. The computing device of claim 1, wherein the data port is accessible via an external face of a physical enclosure for the computing device.

9. A method comprising:
controlling, through verification circuitry of a computing device, an operational mode of a data port of the computing device, wherein controlling includes:
monitoring the computing device for satisfaction of firmware verification mode criteria, wherein monitoring the computer device comprises detecting that an external device is connected to the data port and a signal representing that the computing device is drawing a standby current associated with a standby mode of operation of the computing device;
setting, based on whether the firmware verification mode criteria are satisfied, the operation mode of the data port to a firmware verification mode by routing the data port to a secure data bridge of the verification circuitry to access device memory that stores firmware for the computing device; and
setting, based on whether the firmware verification mode criteria are satisfied, the operational mode of the data port to a normal operation mode by routing the data port along a data path to a central processing unit (CPU) of the computing device.

10. The method of claim 9, further comprising providing read-only access to the device memory through the secure data bridge when the data port operates in the firmware verification mode.

11. The method of claim 9, comprising:
setting the operation mode of the data port to the firmware verification mode responsive to determining firmware verification mode criteria are satisfied; and
setting the operation mode of the data port to the normal operation mode responsive to determining that the firmware verification mode criteria are not satisfied.

12. The method of claim 11, comprising determining the firmware verification mode criteria are satisfied responsive to both receiving a user input requesting firmware verification and detecting that the external device is connected to the data port.

13. The method of claim 9, comprising setting the operational mode of the data port to the normal operation mode further by preventing access to the device memory by the data port.

14. The method of claim 9, further comprising:
in response to the computing device satisfying the firmware verification mode criteria, preventing a boot sequence that includes execution of the firmware.

15. A computing device comprising:
device memory to store firmware of the computing device;
a universal serial bus (USB) port; and
verification circuitry to:
detect a firmware verification condition that includes insertion of an external device into the USB port and a signal representing that the computing device is drawing standby power in association with a standby mode of operation, and in response to detection of the firmware verification condition:
set the USB port to operate in a firmware verification mode;
access the firmware stored on the device memory to compute a hash value from the firmware; and
provide the hash value to the external device inserted into the USB port, the hash value used for firmware verification of the firmware; and
detect removal of the external device from the USB port when the USB port operates in the firmware verification mode, and in response:

set the USB port to operate in a normal operation mode by routing the USB port along a data path to a central processing unit (CPU) of the computing device and preventing access to the device memory.

16. The computing device of claim 15, wherein the verification circuitry is further to authenticate the external device prior to provision of the hash value to the external device.

17. The computing device of claim 15, wherein the verification circuitry comprises a secure data bridge that provides read-only access to the device memory; and wherein the verification circuitry is to access the firmware through the secure data bridge.

18. The computing device of claim 15, wherein the verification circuitry is further to, in response to detection of the firmware verification condition:

prevent a boot sequence that includes execution of the firmware.

19. The computing device of claim 18, wherein the verification circuitry is further to, in response to detection of the removal of the external device from the USB port when the USB port operates in the firmware verification mode:

resume the boot sequence.

20. The computing device of claim 15, wherein the verification circuitry is further to set the USB port to operate in the firmware verification mode in response to a user input requesting the firmware verification.

21. The computing device of claim 15, further comprising a Baseboard Management Controller, wherein the verification circuitry prevents the Baseboard Management Controller from executing the firmware responsive to the verification circuitry determining that the firmware verification mode criteria are satisfied.

\* \* \* \* \*